United States Patent
Wang

(10) Patent No.: US 6,654,986 B2
(45) Date of Patent: Dec. 2, 2003

(54) DETACHABLE HANDLE

(76) Inventor: Yu-Tzu Wang, 21F-3, No. 189, Sec. 2, Keelung Rd., Taipei (TW)

( * ) Notice: Subject to any disclaimer, the term of this patent is extended or adjusted under 35 U.S.C. 154(b) by 0 days.

(21) Appl. No.: 10/066,709

(22) Filed: Feb. 6, 2002

(65) Prior Publication Data

US 2003/0145430 A1 Aug. 7, 2003

(51) Int. Cl.⁷ .............................................. A45L 13/22
(52) U.S. Cl. ............................ 16/422; 16/434; 30/329; 220/756
(58) Field of Search .................... 16/422, 434, 436; 220/756, 759; 30/329, 340, 342

(56) References Cited

U.S. PATENT DOCUMENTS

| | | | | | |
|---|---|---|---|---|---|
| 4,317,248 A | * | 3/1982 | Smith | ........................... | 15/145 |
| D295,725 S | * | 5/1988 | Shioda | ........................ | D8/396 |
| 5,774,994 A | * | 7/1998 | Stein et al. | .................. | 30/342 |
| 6,049,947 A | * | 4/2000 | Lu | .............................. | 16/422 |
| 6,055,733 A | * | 5/2000 | Chen | .......................... | 30/142 |
| D430,699 S | * | 9/2000 | Coleman | | |
| 6,237,226 B1 | * | 5/2001 | Huang | ........................ | 30/322 |

\* cited by examiner

Primary Examiner—Lynne H. Browne
Assistant Examiner—Mark Williams
(74) Attorney, Agent, or Firm—Bacon & Thomas, PLLC

(57) ABSTRACT

A handle for detachably receiving different tools. The handle includes a holding part at one end, and a fitting mechanism on another end. The fitting mechanism includes an upper fitting slot and a lower fitting slot. Each of the fitting slots includes a back support and a pair of bending portions that extend from lateral edges of the respective fitting slots, and the back supports of the fitting slots are secured to one another. A clip hook includes a sloped guiding face and a connecting notch hook. The clip hook is secured to the back support of the lower fitting slot. The clip hook is configured to detachably receive a U-shaped portion of a lower portion of a tool that is guided between the bending portions of the lower fitting slot and the sloped guiding face into the connecting notch hook.

3 Claims, 7 Drawing Sheets

DETACHABLE HANDLE

BACKGROUND OF THE INVENTION

1. Field of the Invention

The invention relates to a detachable handle, in particular the one with fitting mechanism in upper and lower slot bodies formed at one end of the handle capable of providing parts with different functions and shapes for fitting integration.

2. Description of the Background Art

There's a saying about "Nice tools are the prerequisite to get things better ". In the occasion of grill party, the more the tools are the better the quality is, and the cheerful feeling can be secured more relatively. However, more complete tools do not mean that it costs more money to buy. Meanwhile, more space is required for storage. Generally, the grill tools contain grill grid, grill fork, knife and so forth. All these tools usually provide structure similar to the handle provided for holding and most of them are designed in accordance with the features of the tool. Hence, the shape and size are all different, always causing the difficulty in storage. Another question is that manufacturer will put the handle with the same shape and functions to the grill grid with different size as a result of grid areas with different size even when performing the hand-held grill grid with the same features for roasting foods. These handles are integrated with grill grid by fixed combination. Once the tools with the same functions and different sizes are purchased for convenience in grilling, what it costs is some available space to be wasted.

SUMMARY OF THE INVENTION

The handle for grill certainly provide the convenience to operate the grill tool, but the storage space occupation due to it size is the undisputed fact. As a result, the goal of the invention is to provide a handle structure, in which the handle can be in existence independently and one end of the handle is equipped with a fitting mechanism, providing a fitting structure for upper and lower layers. By means of the independent handle with fitting mechanism, the handle can have flexible combination with different grill tool. Moreover, the handle can be disassembled when it is not in use, securing the convenience in having one handle for the operation of various grill tools. Another goal of the invention is to disassemble the handles of tools, which are not necessary to be operated simultaneously, and to move to tools required for operation through the means of the flexibly disassembled handles. As such, it can effectively reduce the space occupation caused by handles installed for all tools in grilling.

PROBLEMS TO BE SOLVED BY THE INVENTION

To accomplish the flexible fitting feature provided for different tools, the structure characteristics of the invention lay on the fitting mechanism installed on one side of handle for holding. The fitting mechanism also provide a fitting structures on top layer and lower layer and each fitting structure is in form of a slot body, in which a place on the bottom of the lower layer slot body is installed with a springy plate hook. In accordance with the said structure, the upper layer slot type fitting structure may allow for the grill tools provided with elastic compression leg to combine with the invention for a operating grill tool by means of two legs fitted in the slot body. Another lower layer slot body in the invention can provide the grill tools with a horizontal tail end directly buckled in the springy plate hook on the bottom of the slot body to integrated with the invention. The upper and lower layer fitting structures of the invention, except the said model, can be treated as the identical structure. The identical structure can be the upper layer slot body or the lower layer slot body.

DESCRIPTION OF THE PREFERRED EMBODIMENTS.

Figure 1:
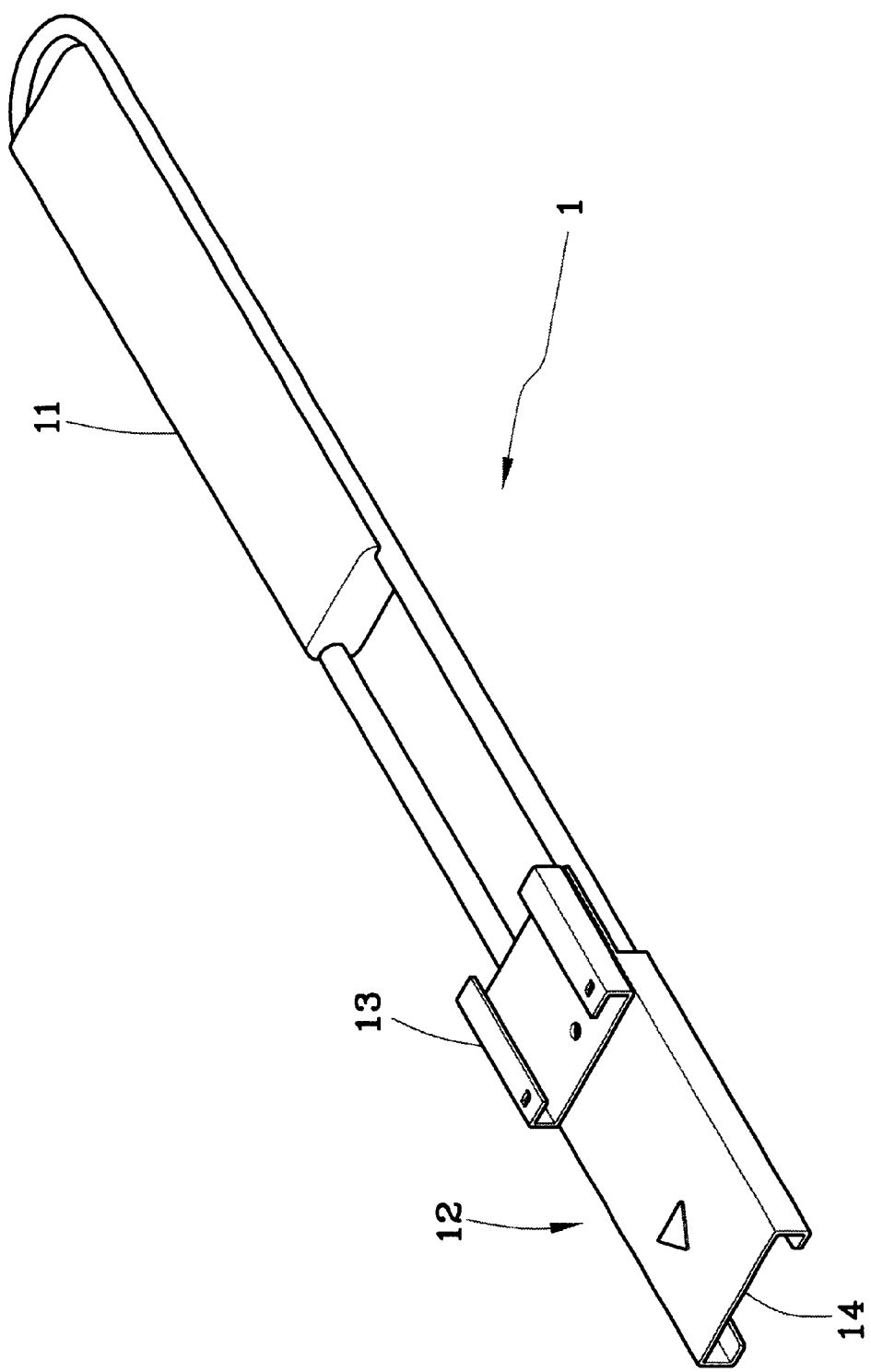
FIG. 1 relates to 3D diagram of the structure view of the invention.
Figure 2:
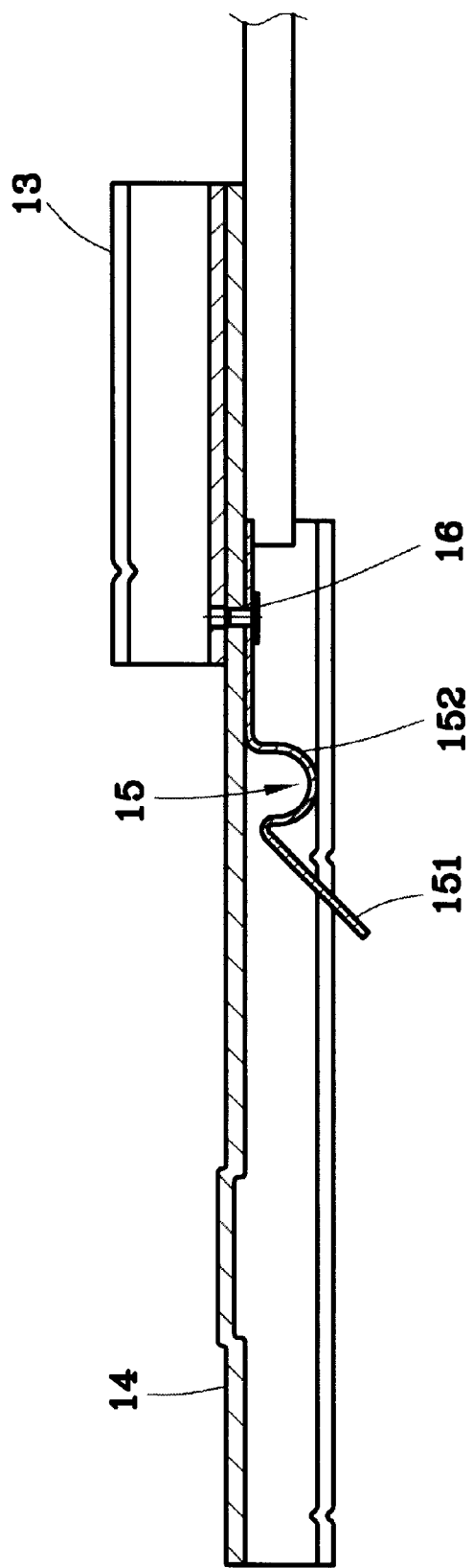
FIG. 2 relates to the front cross sectional diagram of the fitting mechanism of the invention.
Figure 3:
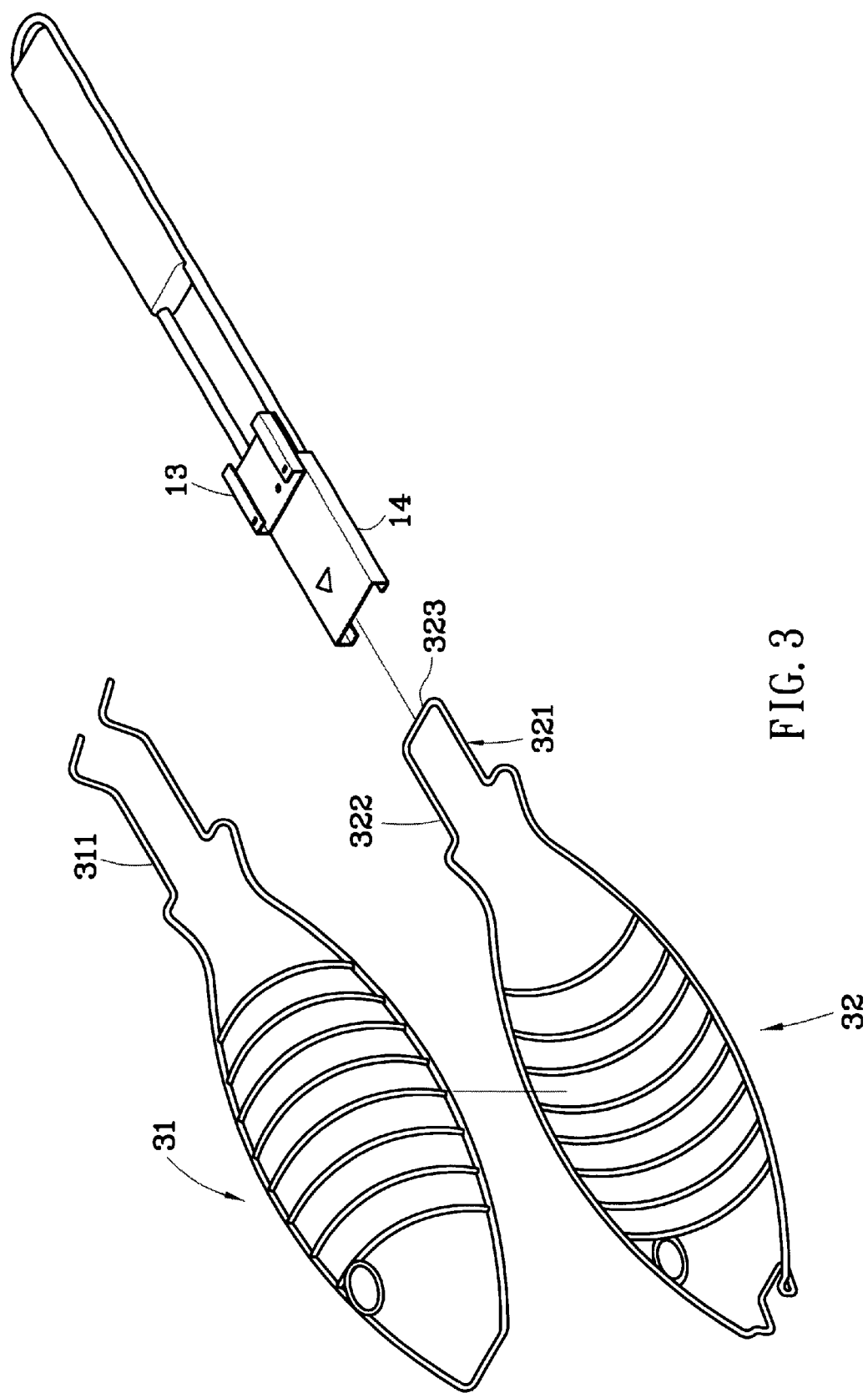
FIG. 3 relates to the 3D decomposition diagram for implementation status of the invention;.

The better implementation structure of the handle 1 of the invention is shown in FIG. 1 and is a long object for holding, in which one end is for holding part 11 and the opposite end is for providing the fitting mechanism 12 integrated with grill tools, in which the fitting mechanism 12 is formed by back to back integrating a upper layer fitting slot 13 and a lower layer fitting slot 14. The fitting slots 13 and 14 have the same shape and width, while the length of the lower layer fitting slot 14 is greater than that of upper layer fitting slot 13. The invention provides a clip hook 15 over a place at bottom side 141 of the lower layer fitting slot, which is made from elastic material, providing a sloped guiding face 151 and the connecting notch hook 152 over the rear end. The clip hook 15 can have fixed integration with the lower layer fitting slot 14 with rivet 16 or welding.

Figure 4:
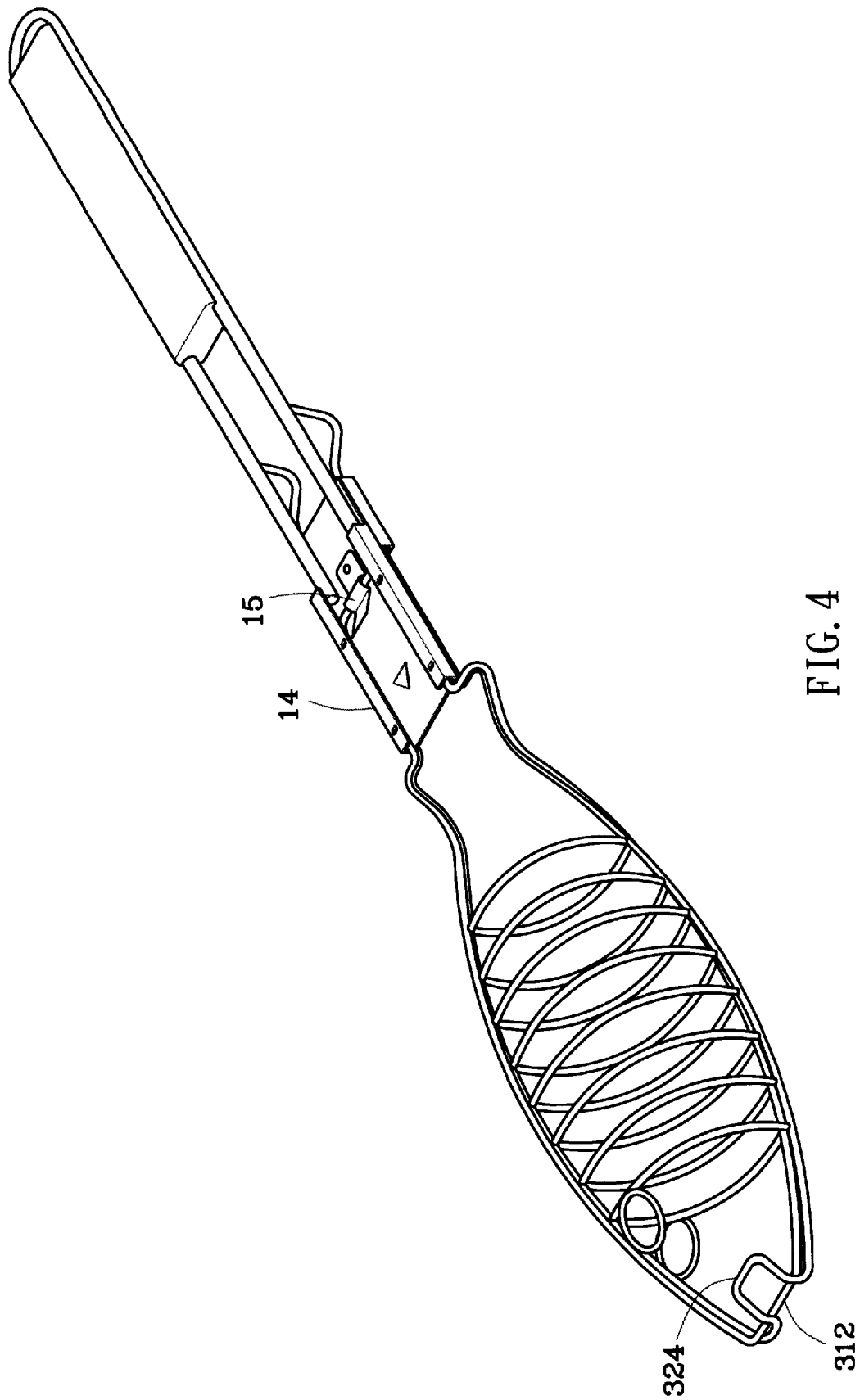
FIG. 4 relates to the 3D diagram for reverse integration in FIG. 3.
Figure 5:
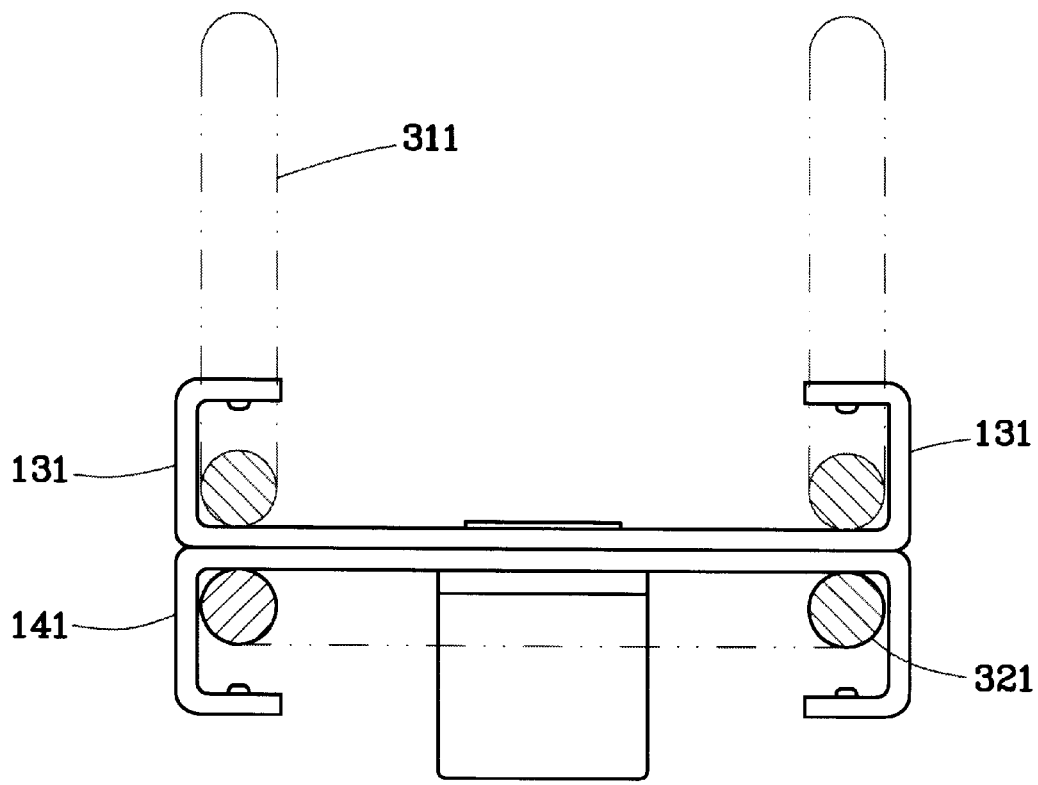
FIG. 5 relates to the side view diagram for the fitting mechanism and the grill grid assembly of the invention.
Figure 6:
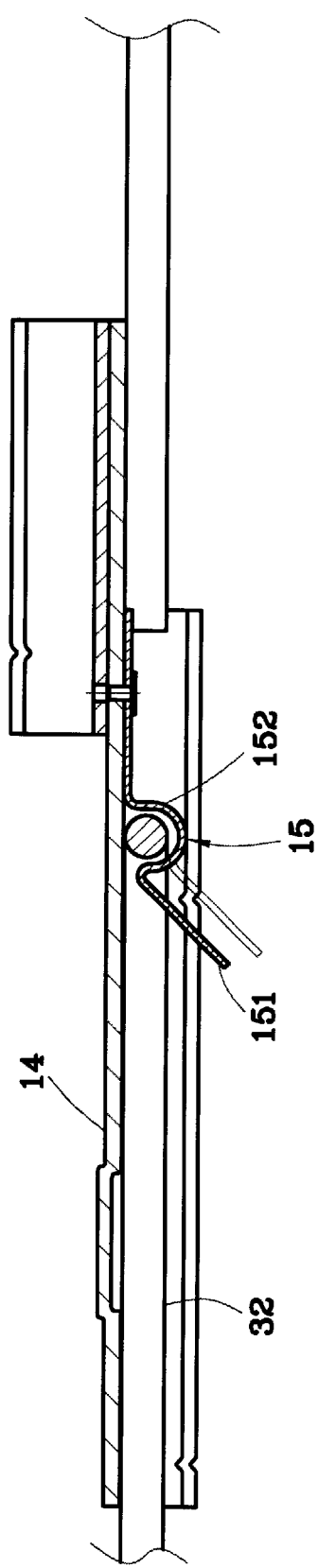
FIG. 6 relates to the front view diagram of the lower layer fitting slot in the invention integrated with grill grid.
Figure 7:
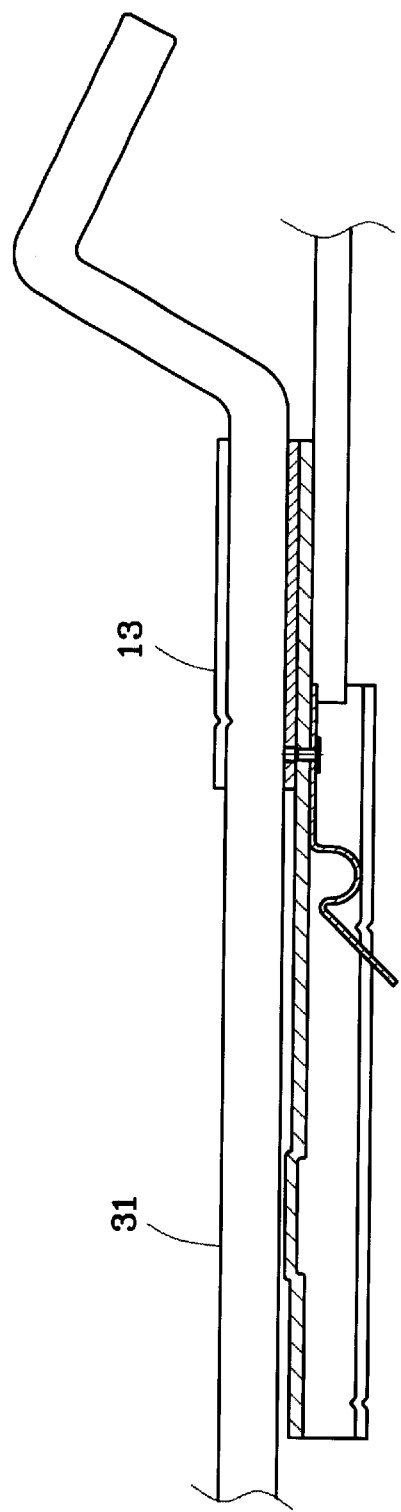
FIG. 7 relates to the front view diagram of the upper layer fitting slot in the invention integrated with grill grid.
Figure 8:
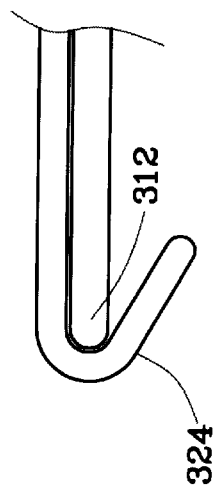
FIG. 8 relates to the structure in integration of one end portion of one kind of grill grid applied in the invention.

The invention and the assembly method of grill tools are as shown in FIG. 3 ~8 capable of simultaneously providing a detachable grill grid 3 and its assembly, in which the tail end of the upper layer grill grid 31 is provided with two parallel legs 311. By means of relative slight compression of the leg 311, it can be fitted in the bending portion 131 on the left and right sides of the upper layer fitting slot 13 and the upper layer grill grid 31 is integrated in the upper layer fitting slot 13 of the handle 1 (as shown in FIG. 5, 7). The lower layer grill grid 32 possesses a U type tail end 321, providing a longitudinal parallel part 322 with identical width of the lower layer fitting slot 14 and the horizontal end 323 over the tail portion. Use the longitudinal parallel part 322 of the U type tail end 321 to wedge into the inner side of the left and right sides of the bending part 141 of the lower layer fitting slot (as shown in FIG. 5) and the horizontal end 323 pushes in and is fastened in the notch hook 152 by means of the sloped guiding face 151 of the clip hook 15 so that the lower layer grill grid 32 is integrated in the lower layer fitting slot 14 (as shown in FIG. 4, 6). For the said upper layer grill grids 31 and 32 integrated in the upper and lower layer fitting slots 13 and 14 of the handle 1 if it is necessary to combine both as a whole, the front end of one of the grill grid such as lower layer grill grid 32 is bent as a hook 324. The front horizontal rod 312 of the upper layer grill grid 31 is fitted in the hook 324 to provide the integration with the corresponding place of the handle 1 with the upper and lower layer grill grids 31 and 31.

In accordance with the said structure of the handle 1, it is allowable to provide the integration with one of the upper and lower layer fitting slots of the grill grid with integration capability with the handle, or integration with both the upper and lower fitting slots at the same time.

What is claimed is:

1. A handle for detachably receiving different tools, comprising:

a holding part at one end of the handle;

a fitting mechanism on another end of the handle, the fitting mechanism comprising an upper fitting slot and a lower fitting slot, each of the fitting slots includes a back support and a pair of bending portions that extend from lateral edges of the respective fitting slots, and the back supports of the fitting slots are secured to one another;

a clip hook comprising a sloped guiding face and a connecting notch hook, the clip hook is secured to the back support of the lower fitting slot, the clip hook is configured to detachably receive a U-shaped portion of a lower portion of a tool that is guided between the bending portions of the lower fitting slot and the sloped guiding face into the connecting notch hook so that the U-shaped portion is secured between the connecting notch hook and the back support of the lower fitting slot; and the bending portions of the upper fitting slot is configured to detachably receive an upper portion of a tool therebetween.

2. The handle as claimed in claim 1, wherein the clip hook is riveted to the back support of the lower fitting slot.

3. The handle as claimed in claim 1, wherein the clip hook is welded to the back support of the lower fitting slot.

* * * * *